(12) United States Patent
Yu et al.

(10) Patent No.: US 11,899,121 B2
(45) Date of Patent: Feb. 13, 2024

(54) ANGLE MEASUREMENT RESULT SENDING METHOD AND APPARATUS

(71) Applicant: Huawei Technologies Co., Ltd., Shenzhen (CN)

(72) Inventors: Yingjie Yu, Shanghai (CN); Su Huang, Shanghai (CN); Yi Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 8 days.

(21) Appl. No.: 17/707,649

(22) Filed: Mar. 29, 2022

(65) Prior Publication Data
US 2022/0221545 A1 Jul. 14, 2022

Related U.S. Application Data

(63) Continuation of application No. PCT/CN2019/109197, filed on Sep. 29, 2019.

(51) Int. Cl.
*G01S 3/00* (2006.01)
*G01S 3/48* (2006.01)
(Continued)

(52) U.S. Cl.
CPC ............. *G01S 3/48* (2013.01); *G08C 17/02* (2013.01); *H04W 64/006* (2013.01); *G08C 2200/00* (2013.01)

(58) Field of Classification Search
CPC ....... G01S 3/48; G08C 17/02; G08C 2200/00; H04W 64/006
See application file for complete search history.

(56) References Cited

U.S. PATENT DOCUMENTS

| 2019/0037529 | A1* | 1/2019 | Edge | G01S 1/0428 |
| 2020/0333427 | A1* | 10/2020 | Hu | H04W 64/00 |
| 2021/0297817 | A1* | 9/2021 | Liu | G01S 5/0009 |

FOREIGN PATENT DOCUMENTS

| CN | 105589506 A | 5/2016 |
| CN | 107438955 A | 12/2017 |

(Continued)

OTHER PUBLICATIONS

Huawei HiSilicon, "NR positioning measurements," 3GPP TSG RAN WG1 #97, Reno, USA, R1-1906054, total 15 pages, 3rd Generation Partnership Project, Valbonne, France (May 13-17, 2019).

(Continued)

*Primary Examiner* — Khai M Nguyen
(74) *Attorney, Agent, or Firm* — Leydig, Voit & Mayer, Ltd.

(57) ABSTRACT

This application provides an angle measurement result sending method and an apparatus. The method includes: The second device receives a reference signal sent by the first device; the second device measures the reference signal to obtain a first angle measurement result, where the first angle measurement result is a measurement result of a first measurement object, the first measurement object is a direct path or a reflection path, the first angle measurement result includes M angle measurement parameters, at least one of the M angle measurement parameters in the first angle measurement result includes a plurality of angle measurement values, and M is a positive integer greater than or equal to 1; the second device sends the first angle measurement result to the location management device; and the location management device determines the location of the first device based on the first angle measurement result.

12 Claims, 6 Drawing Sheets

(51) Int. Cl.
G08C 17/02 (2006.01)
H04W 64/00 (2009.01)

(56) References Cited

FOREIGN PATENT DOCUMENTS

| CN | 109905224 A | 6/2019 |
|---|---|---|
| WO | 2015027118 A1 | 2/2015 |
| WO | 2017164925 A1 | 9/2017 |
| WO | 2019147305 A1 | 8/2019 |
| WO | 2019154088 A1 | 8/2019 |

OTHER PUBLICATIONS

"3rd Generation Partnership Project; Technical Specification Group Radio Access Network; NG-RAN; NR Positioning Protocol A (NRPPa) (Release 15)," 3GPP TS 38.455 V15.2.1, total 60 pages, 3rd Generation Partnership Project, Valbonne, France (Jan. 2019).

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN(Release 15)," 3GPP TS 36.305 V15.4.0, total 91 pages, 3rd Generation Partnership Project, Valbonne, France (Jun. 2019).

Qualcomm Incorporated, "DL and UL NR Positioning Procedures," 3GPP TSG-RAN WG2 Meeting #106, Reno, Nevada, USA, R2-1906779, Revision of R2-1903135, total 8 pages, 3rd Generation Partnership Project, Valbonne, France (May 13-17, 2019).

"3rd Generation Partnership Project; Technical Specification Group Radio Access Network; NR; Physical layer measurements (Release 15)," 3GPP TS 38.215 V15.5.0, total 16 pages, 3rd Generation Partnership Project, Valbonne, France (Jun. 2019).

"3rd Generation Partnership Project; Technical Specification Group Radio Access Network; Evolved Universal Terrestrial Radio Access (E-UTRA); Radio Resource Control (RRC); Protocol specification(Release 15)," 3GPP TS 36.331 V15.7.0, total 962 pages, 3rd Generation Partnership Project, Valbonne, France (Sep. 2019).

Intel Corporation, "UE and gNB Measurements for NR Positioning," 3GPP TSG RAN WG1 Meeting #96bis, Xi'an, China, R1-1904321, total 9 pages, 3rd Generation Partnership Project, Valbonne, France (Apr. 8-12, 2019).

"3rd Generation Partnership Project; Technical Specification Group Radio Access Network; Evolved Universal Terrestrial Radio Access (E-UTRA); LTE Positioning Protocol A (LPPa) (Release 15)," 3GPP TS 36.455 V15.2.1, total 84 pages, 3rd Generation Partnership Project, Valbonne, France (Jan. 2019).

"3rd Generation Partnership Project; Technical Specification Group Radio Access Network; Evolved Universal Terrestrial Radio Access Network (E-UTRAN); SLm interface Application Protocol (SLmAP)(Release 15)," 3GPP TS 36.459 V15.0.0, total 47 pages, 3rd Generation Partnership Project, Valbonne, France (Jun. 2018).

"3rd Generation Partnership Project; Technical Specification Group Radio Access Network; NG Radio Access Network (NG-RAN); Stage 2 functional specification of User Equipment (UE) positioning in NG-RAN (Release 15)," 3GPP TS 38.305 V15.4.0, total 72 pages, 3rd Generation Partnership Project, Valbonne, France (Jun. 2019).

"3rd Generation Partnership Project; Technical Specification Group Radio Access Network; Study on NR positioning support (Release 16)," 3GPP TR 38.855 V16.0.0, total 197 pages, 3rd Generation Partnership Project, Valbonne, France (Mar. 2019).

"On how to discriminate the line-of-sight path in a multipath environment using spatial Doppler analysis," 3GPP TSG RAN WG4 Meeting #90, Athens, Greek, R4-1902259, pp. 1-7, 3rd Generation Partnership Project, Valbonne, France (Feb. 25-Mar. 1, 2018).

"Discussion on Possible Techniques for NR Positioning," 3GPP TSG RAN WG1 Meeting #94bis, Chengdu, China, R1-1810315, Total 7 pages, 3rd Generation Partnership Project, Valbonne, France (Oct. 8-12, 2018).

"Discussions on Possible Techniques for NR Positioning," 3GPP TSG RAN WG1 Meeting #95, Spokane, USA, R1-1812595, Total 8 pages, 3rd Generation Partnership Project, Valbonne, France (Nov. 12-16, 2018).

"Status Report to TSG," 3GPP TSG RAN meeting #83, Shenzhen, China, RP-190196, Total 14 pages, 3rd Generation Partnership Project, Valbonne, France (Mar. 18-21, 2019).

* cited by examiner

Angle of arrival (°)

Angle of arrival (°)

Angle of arrival (°)

ANGLE MEASUREMENT RESULT SENDING METHOD AND APPARATUS

CROSS-REFERENCE TO RELATED APPLICATIONS

This application is a continuation of International Application No. PCT/CN2019/109197, filed on Sep. 29, 2019, the disclosure of which is hereby incorporated by reference in its entirety.

TECHNICAL FIELD

Embodiments of this application relate to the communication field, and more specifically, to an angle measurement result sending method and an apparatus.

BACKGROUND

With rapid development of communication technologies, high precision positioning is increasingly required. The high precision positioning is determined as an important research project in a third generation partnership project (3GPP) fifth generation wireless communication system (5G). For example, in enhanced mobile broadband (eMBB), positioning precision is required to be less than 1 meter indoor and less than 10 meters outdoor.

Therefore, how to improve positioning precision of a device is an urgent problem to be resolved.

SUMMARY

This application provides an angle measurement result sending method and an apparatus, so that an access network device reports a plurality of angle measurement values based on one measurement object, and a location management function (LMF) may select, based on an optimization algorithm, a more reliable angle measurement value to position a terminal device. This helps improve positioning precision.

According to a first aspect, an angle measurement result sending method is provided. The method includes: The second device receives a reference signal sent by a first device; the second device measures the reference signal to obtain a first angle measurement result, where the first angle measurement result is a measurement result of a first measurement object, the first measurement object is a direct path or a reflection path, the first angle measurement result includes M angle measurement parameters, at least one of the M angle measurement parameters in the first angle measurement result includes a plurality of angle measurement values, and M is a positive integer greater than or equal to 1; and the second device sends the first angle measurement result to a location management device. For one measurement object, the second device may obtain a plurality of angle measurement values through measurement. The second device reports all angle measurement values in an angle measurement result to the location management device, so that the location management device can select a more reliable angle measurement value from the plurality of angle measurement values to determine a location of the first device. This helps improve positioning precision.

In a possible design, the M angle measurement parameters are any M of the following angle measurement parameters: a horizontal incident angle, a vertical incident angle, an antenna lateral array incident angle, and an antenna longitudinal array incident angle. The second device may measure any one or more of the foregoing four angles, so that an angle measurement parameter can be selected more flexibly. The location of the first device can be determined based on any one of the foregoing four angles.

In a possible design, the second device measures the reference signal to obtain a second angle measurement result, where the second angle measurement result is a measurement result of a second measurement object, the second measurement object is a direct path or a reflection path, the second angle measurement result includes M angle measurement parameters, and at least one of the M angle measurement parameters in the second angle measurement result includes a plurality of angle measurement values; and the second device sends the second measurement result to the location management device. The second measurement object is different from the first measurement object. For example, the first measurement object is a direct path and the second measurement object is a reflection path. For another example, the first measurement object is a reflection path and the second measurement object is a direct path. For another example, the first measurement object is a reflection path and the second measurement object is another reflection path different from the first measurement object. In this way, the second device can measure an incident angle corresponding to any path on which the first device sends a signal. The location of the first device can be determined based on an incident angle corresponding to any path.

According to a second aspect, an angle measurement result sending method is provided. The method includes: A location management device receives a first angle measurement result sent by a second device, where the first angle measurement result is a measurement result of a first measurement object, the first measurement object is a direct path or a reflection path, the first angle measurement result includes M angle measurement parameters, at least one of the M angle measurement parameters in the first angle measurement result includes a plurality of angle measurement values, and M is a positive integer greater than or equal to 1; and the location management device determines a location of a first device based on the first angle measurement result. For one measurement object, the second device may obtain a plurality of angle measurement values through measurement. The location management device receives all angle measurement values in an angle measurement result, so that the location management device can select a more reliable angle measurement value from the plurality of angle measurement values to determine the location of the first device. This helps improve positioning precision.

In a possible design, the M angle measurement parameters are any M of the following angle measurement parameters: a horizontal incident angle, a vertical incident angle, an antenna lateral array incident angle, and an antenna longitudinal array incident angle. The second device may measure any one or more of the foregoing four angles, so that an angle measurement parameter can be selected more flexibly. The location of the first device can be determined based on any one of the foregoing four angles.

In a possible design, the location management device receives a second angle measurement result sent by the second device, where the second angle measurement result is a measurement result of a second measurement object, the second measurement object is a direct path or a reflection path, the second angle measurement result includes M angle measurement parameters, and at least one of the M angle measurement parameters in the second angle measurement result includes a plurality of angle measurement values; and the location management device determines the location of the first device based on the second angle measurement result. The second measurement object is different from the first measurement object. For example, the first measurement object is a direct path and the second measurement object is a reflection path. For another example, the first measurement object is a reflection path and the second measurement object is a direct path. For another example, the first measurement object is a reflection path and the second measurement object is another reflection path different from the first measurement object. In this way, the location management device can determine the location of the first device based on an incident angle corresponding to any path on which the first device sends a signal.

According to a third aspect, a communication apparatus is provided. The communication apparatus includes modules configured to perform the method in any one of the first aspect or the possible implementations of the first aspect.

According to a fourth aspect, a communication apparatus is provided. The communication apparatus includes modules configured to perform the method in any one of the second aspect or the possible implementations of the second aspect.

According to a fifth aspect, a communication apparatus is provided. The communication apparatus may be the second device in the foregoing method design, or may be a chip disposed in the second device. The communication apparatus includes a processor that is coupled to a memory, and the processor may be configured to execute instructions in the memory, to implement the method performed by the second device in any one of the first aspect and the possible implementations of the first aspect. Optionally, the communication apparatus further includes the memory. Optionally, the communication apparatus further includes a communication interface, and the processor is coupled to the communication interface.

When the communication apparatus is the second device, the communication interface may be a transceiver or an input/output interface.

When the communication apparatus is a chip disposed in the second device, the communication interface may be an input/output interface.

Optionally, the transceiver may be a transceiver circuit. Optionally, the input/output interface may be an input/output circuit.

According to a sixth aspect, a communication apparatus is provided. The communication apparatus may be the location management device in the foregoing method design, or may be a chip disposed in the location management device. The communication apparatus includes a processor that is coupled to a memory, and the processor may be configured to execute instructions in the memory, to implement the method performed by the network device in any one of the second aspect and the possible implementations of the second aspect. Optionally, the communication apparatus further includes the memory. Optionally, the communication apparatus further includes a communication interface, and the processor is coupled to the communication interface.

When the communication apparatus is the location management device, the communication interface may be a transceiver or an input/output interface.

When the communication apparatus is a chip disposed in the location management device, the communication interface may be an input/output interface.

Optionally, the transceiver may be a transceiver circuit. Optionally, the input/output interface may be an input/output circuit.

According to a seventh aspect, a program is provided. When being executed by a processor, the program is configured to perform any method in the first aspect or the second aspect and the possible implementations of the first aspect or the second aspect.

According to an eighth aspect, a program product is provided. The program product includes program code. When the program code is run by a communication unit, a processing unit, a transceiver, or a processor of a communication apparatus (for example, a first device), the communication device is enabled to perform any method in the first aspect and the possible implementations of the first aspect.

According to a ninth aspect, a program product is provided. The program product includes program code. When the program code is run by a communication unit, a processing unit, a transceiver, or a processor of a communication apparatus (for example, a location management device), the communication device is enabled to perform the method in any one of the second aspect and the possible implementations of the second aspect.

According to a tenth aspect, a computer-readable storage medium is provided. The computer-readable storage medium stores a program. The program enables a communication apparatus (for example, a first device) to perform the method in any one of the first aspect and the possible implementations of the first aspect.

According to an eleventh aspect, a computer-readable storage medium is provided. The computer-readable storage medium stores a program. The program enables a communication apparatus (for example, a location management device) to perform the method in any one of the second aspect and the possible implementations of the second aspect.

DESCRIPTION OF EMBODIMENTS

Figure 1:
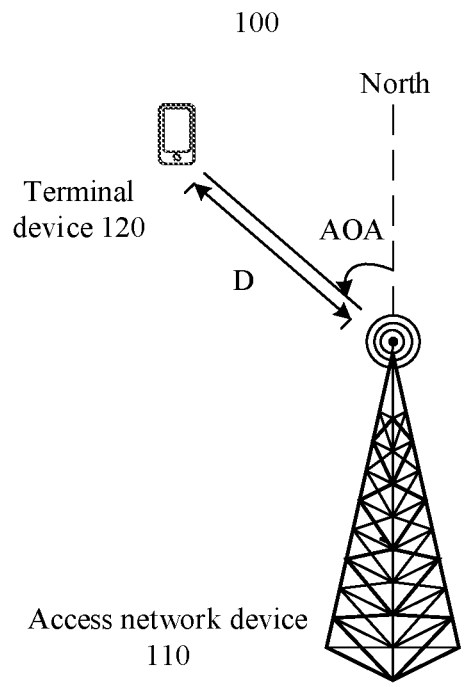
FIG. 1 is a schematic diagram of an architecture of a communication system of a positioning method and a device in a conventional technology.

The following describes the technical solutions in this application with reference to the accompanying drawings.

In embodiments of this application, "a plurality of" may be understood as "at least two", and "a plurality of items" may be understood as "at least two items".

The technical solutions in the embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5G system, or an NR system.

A terminal device in the embodiments of this application may include a handheld device, a vehicle-mounted device, a wearable device, or a computing device that has a wireless communication function. For example, the UE may be a mobile phone, a tablet computer, or a computer having a wireless transceiver function. The terminal device may alternatively be a virtual reality (VR) terminal device, an augmented reality (AR) terminal device, a wireless terminal in industrial control, a wireless terminal in unmanned driving, a wireless terminal in telemedicine, a wireless terminal in a smart grid, a wireless terminal in a smart city, a wireless terminal in a smart home, a wearable device, a vehicle-mounted device, or the like. This is not limited in the embodiments of this application.

An access network device in the embodiments of this application may be a device configured to communicate with the terminal device, and may be in a plurality of forms, for example, a macro base station, a micro base station, a relay station, and an access point. The access network device may be a base station in new radio (NR). The base station in the 5G NR may also be referred to as a transmission reception point (TRP) or a next generation NodeB (next Node B, gNB), a base transceiver station (BTS) in a global system for mobile communication (GSM) or a code division multiple access (CDMA) system, a NodeB (NB) in a wideband code division multiple access (WCDMA) system, an evolved NodeB (evolutional Node B, eNB or eNodeB) in a long term evolution (LTE) system, or a base station in a next generation communication system, for example, a 6G base station.

In the embodiments of this application, the terminal device or the access network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device, the access network device, or a function module that can invoke and execute the program and that is in the terminal device or the access network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry instructions and/or data.

FIG. 1 is a schematic diagram of an architecture of a communication system of a positioning method and a device in a conventional technology. As shown in FIG. 1, the system 100 includes an access network device 110 and a terminal device 120.

The access network device 110 obtains through measurement a direction from an AOA to the terminal device 120. Then, the access network device 110 determines a timing advance (timing advance, TA) based on measured uplink transmission of the terminal device 120, to obtain a distance between the terminal device 120 and the access network device 110:

$$D=0.5 \times TA \times c$$

where D represents the distance between the terminal device 120 and the access network device 110, TA represents the timing advance, and c represents the speed of light.

Finally, the terminal device 120 is positioned based on measurement values of the AOA and D.

An NR protocol stipulates that a next-generation evolved node (next-generation evolutional Node B, ng-eNB) supports AOA measurement on the terminal device. A measured AOA uses the north direction as a normal direction and uses the counterclockwise direction as the positive direction. The TA may be obtained through joint measurement of the terminal device and the ng-eNB, or may be obtained through separate measurement of the ng-eNB. The AOA+TA positioning method can implement positioning by using a single station, and can still implement positioning when the terminal device does not support a positioning function.

Figure 2:
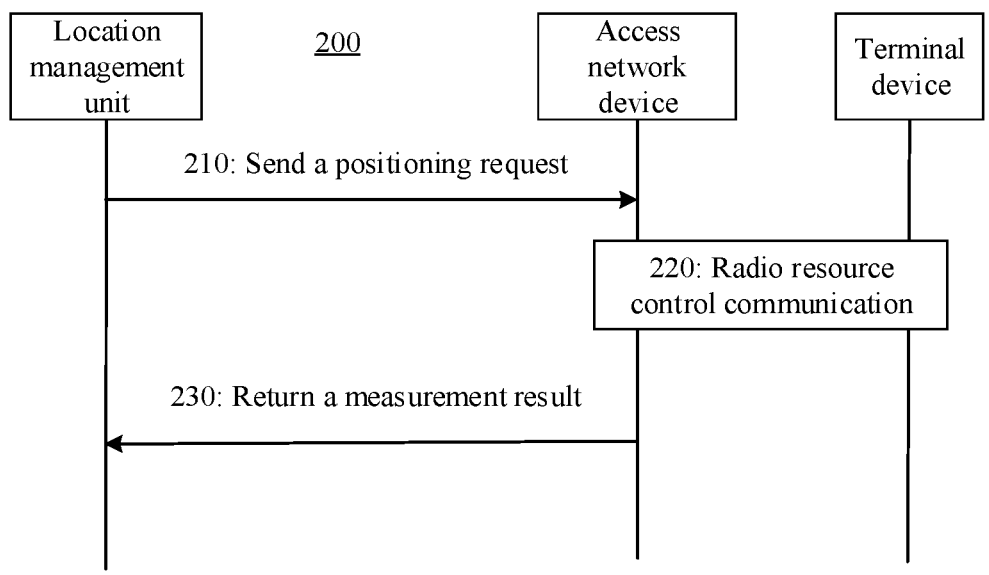
FIG. 2 is a schematic flowchart of an AOA+TA positioning technology.

FIG. 2 is a schematic flowchart of an AOA+TA positioning technology.

210: A location management unit sends a positioning request to an access network device; and correspondingly, the access network device receives the positioning request from the location management unit. The positioning request includes a request for measurement and a specification of a measurement time. The location management unit may communicate with the access network device by using an additional new radio positioning protocol (NR positioning protocol annex, NRPPa).

220: The access network device measures a terminal device, where the measurement is implemented through a radio resource control measurement procedure (radio resource control measurement procedure, RRC Measurement Procedure).

230: The access network device sends a measurement result to the location management unit; and correspondingly, the location management unit receives the measurement result sent by the access network device. The measurement result includes measurement values such as an AOA and a TA. If the measurement fails, failure information is returned.

A positioning error of an AOA+TA positioning technology is large. Therefore, the AOA+TA positioning technology is merely applicable to a scenario of a short distance or a low precision requirement. When a distance between the access network device and the terminal device is large, a large positioning distance deviation is caused due the large distance even if there is a minor AOA measurement error.

Another positioning method is to calculate an angle of arrival location by using an antenna array. In the method, an antenna side lobe may be excessively large due to an undesirable antenna array element spacing. Consequently, angle estimation is inaccurate. In theoretical research, when an antenna array element spacing d is half of a received signal wavelength $\lambda$, a problem that an angle value is incorrectly estimated due to an excessively large side lobe does not exist.

Figure 3:
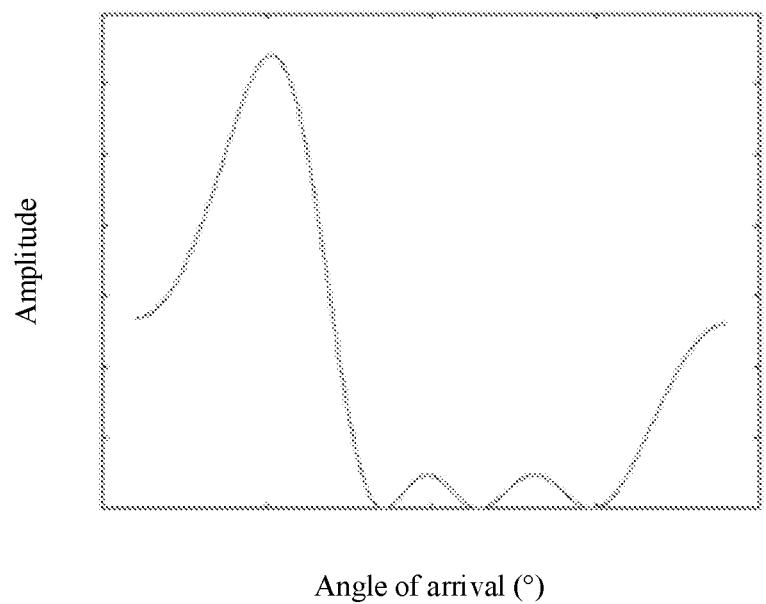
FIG. 3 is a spectrum diagram generated by using a DFT method when an antenna array element spacing is $\lambda/2$.
Figure 4:
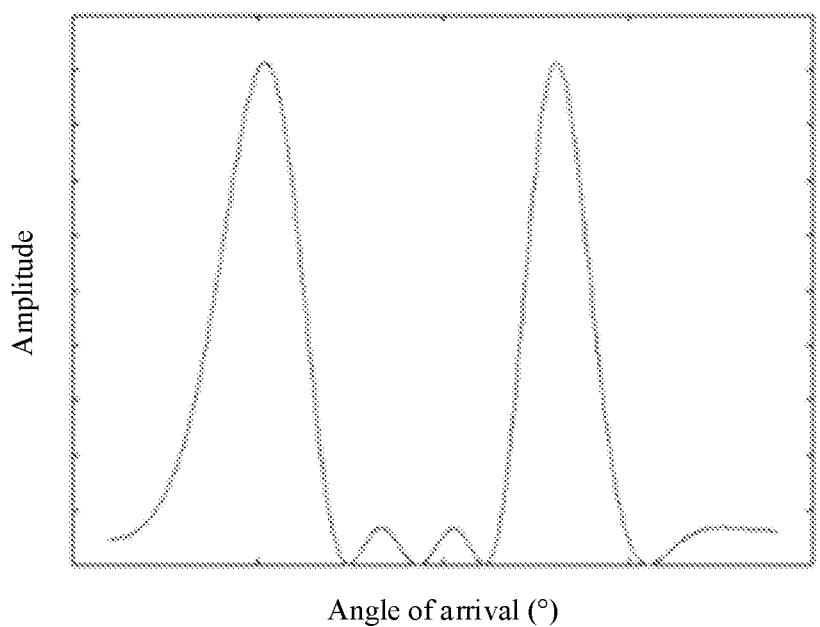
FIG. 4 is a spectrum diagram generated by using a DFT method when an antenna array element spacing is $0.8\lambda$.
Figure 5:
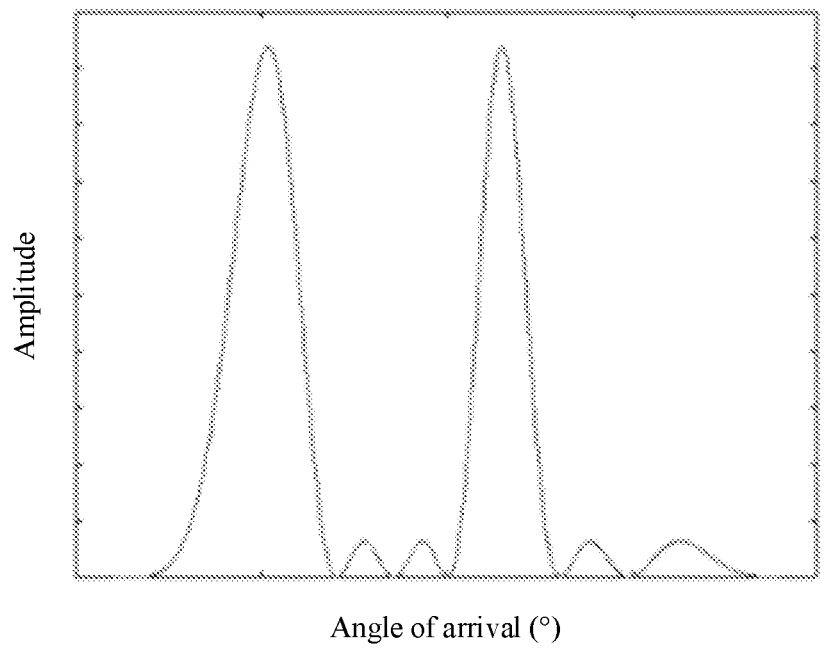
FIG. 5 is a spectrum diagram generated by using a DFT method when an antenna array element spacing is $\lambda$.

For example, an incident angle is estimated by using a discrete Fourier transform (DFT) method. FIG. 3 shows that angle information calculated based on a spectrum generated by using the DFT method is the unique solution when the antenna array element spacing is an ideal value $\lambda/2$. In practical engineering, the antenna array element spacing usually cannot be ensured to be the ideal value $\lambda/2$, and an actual spacing may be greater than $\lambda/2$. FIG. 4 and FIG. 5 show that for a same incident angle, two peak values appear on each spectrum generated by using a DFT method when antenna array element spacings are $0.8\lambda$ and $1\lambda$. One of the two peak values in each spectrum graph is an incorrect estimation value caused by a side lobe.

To be specific, when the antenna array element spacing is greater than the ideal value $\lambda/2$, a plurality of measurement values may be estimated for one measurement object. If only one measurement value is selected for reporting, an incorrect value may be selected. However, there is no corresponding angle selection solution currently.

This application provides an angle measurement result sending method and a device, in which a plurality of angle measurement values can be reported for one measurement object. In this way, problems of incorrect selection of an angle measurement value caused when the antenna array element spacing is greater than the ideal value $\lambda/2$ can be reduced.

Figure 6:
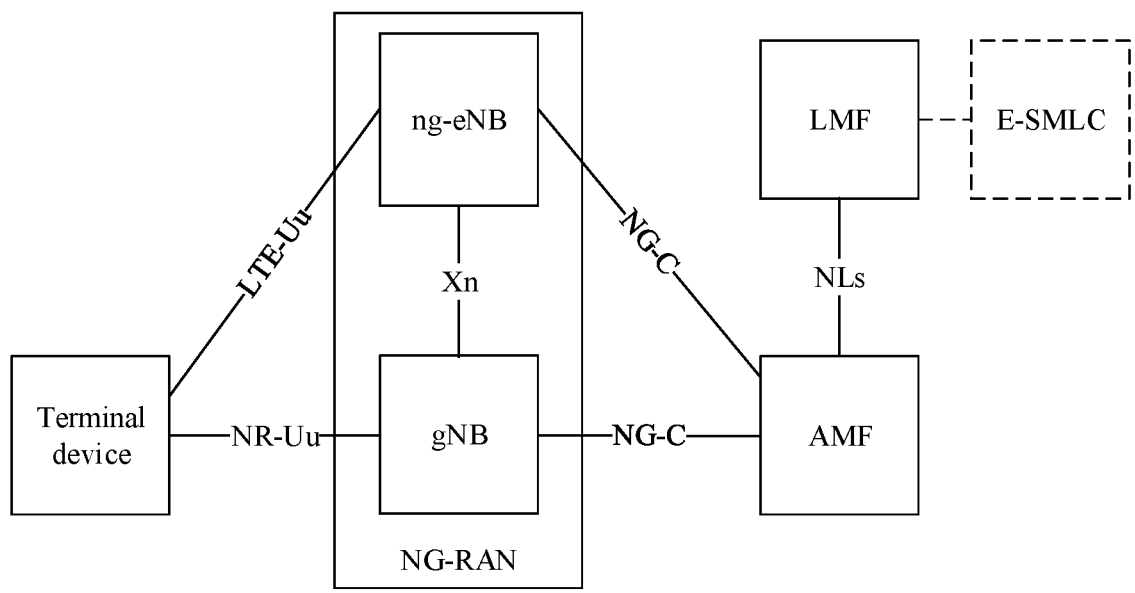
FIG. 6 is a schematic diagram of an architecture of a positioning system for positioning a terminal device to which an embodiment of this application is applicable.

FIG. 6 is a schematic diagram of an architecture of a positioning system for positioning a terminal device to which an embodiment of this application is applicable. As shown in FIG. 6, in the positioning system, the terminal device is separately connected to a radio access network through an LTE-Uu interface and/or an NR-Uu interface by using an ng-eNB and a gNB. The radio access network is connected to a core network through an NG-C interface by using an access and mobility management function (AMF) unit. A next-generation radio access network (NG-RAN) includes one or more ng-eNBs. The NG-RAN may alternatively include one or more gNBs. The NG-RAN may alternatively include one or more ng-eNBs and gNBs. The ng-eNB communicates with the gNB through an Xn interface. The ng-eNB is an LTE access network device accessing a 5G core network, and the gNB is a 5G access network device accessing the 5G core network. The core network includes units such as an AMF and an LMF (or an evolved serving mobile location center (E-SMLC)). The AMF is configured to implement a function such as access management. The LMF (or the E-SMLC) is configured to implement a function such as positioning. The AMF and the LMF are connected through an NLs interface. The LMF is an apparatus or component deployed in the core network to provide a positioning function for the terminal device.

Figure 7:
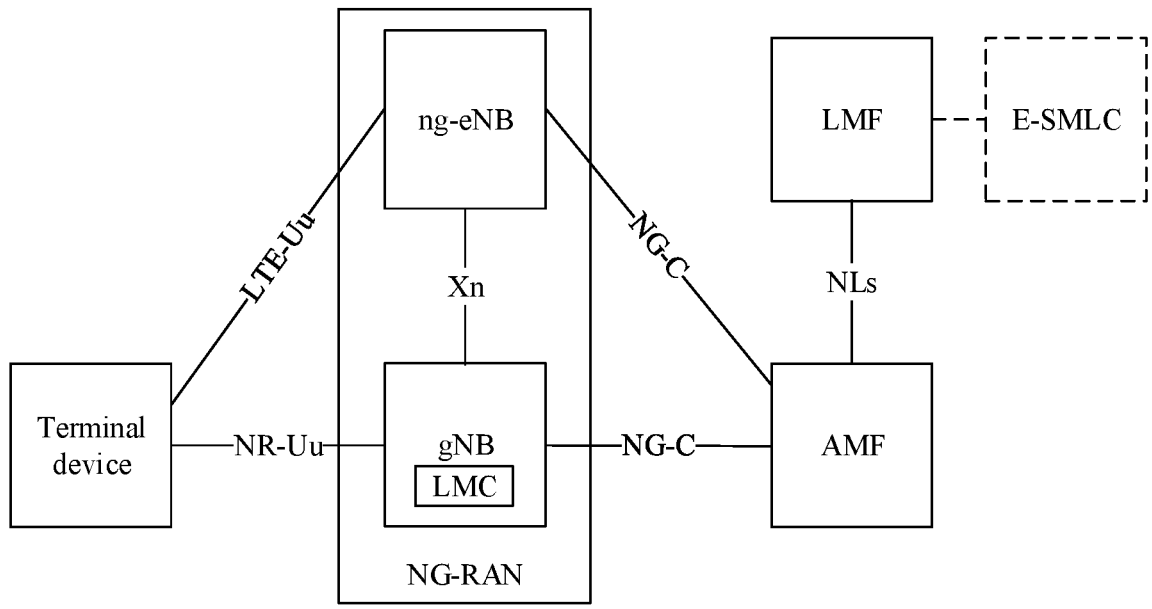
FIG. 7 is a schematic diagram of an architecture of another positioning system for positioning a terminal device to which an embodiment of this application is applicable.

FIG. 7 is a schematic diagram of an architecture of another positioning system for positioning a terminal device to which an embodiment of this application is applicable. A difference between the architectures of the positioning systems in FIG. 7 and FIG. 6 is that a location management component (LMC) in FIG. 7 is deployed in a gNB, and the LMC can perform a part of a function of the LMF, and the gNB does not need to report a measurement result to the core network. Therefore, signaling overheads are reduced and a positioning delay is reduced.

In this embodiment of this application, a positioning function node (for example, the E-SMLC or the LMF) collects measurement information reported by the access network device, to determine a location of the terminal device. Optionally, the access network device interacts with the E-SMLC by using an LPPa protocol, and the access network device interacts with the LMF by using an NRPPa protocol.

It should be understood that the communication system in FIG. 6 or FIG. 7 may include one or more gNBs and one or more terminal devices. A single gNB may transmit data or control signaling to a single terminal device or a plurality of terminal devices. A plurality of gNBs may simultaneously transmit data or control signaling to one terminal device.

It should be further understood that the device or function node included in the communication system in FIG. 6 or FIG. 7 is merely an example for description, and does not constitute a limitation on the embodiments of this application. Actually, the positioning system in FIG. 6 or FIG. 7 may further include another network element, device, or function node that has an interaction relationship with the device or function node shown in the figure. This is not specifically limited herein.

Figure 8:
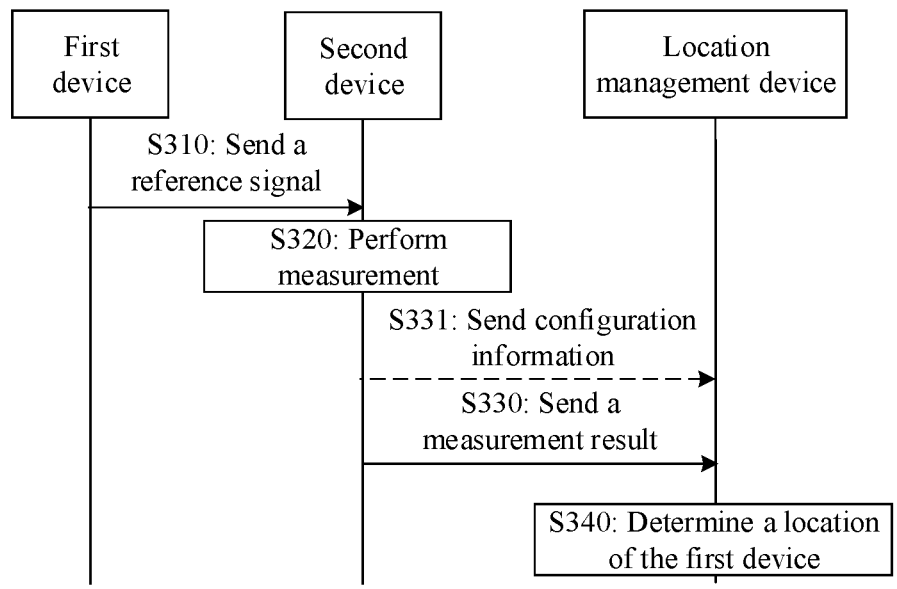
FIG. 8 is a schematic flowchart of an angle measurement result sending method according to this application.

FIG. 8 is a schematic flowchart of an angle measurement result sending method 300 according to this application. As shown in FIG. 8, the method 300 includes the following steps.

S310: A first device sends a reference signal to a second device; and correspondingly, the second device receives the reference signal from the first device.

Optionally, the first device may be a terminal device or a component (for example, a chip or a circuit) used for a terminal device, and the second device may be an access network device or a component (for example, a chip or a circuit) used for an access network device. The access network device may measure reference signals of different terminal devices, different reference signals of a same terminal device, or different transmission paths of a same reference signal.

Optionally, the first device may be an access network device or a component (for example, a chip or a circuit) used for an access network device, and the second device may be a terminal device or a component (for example, a chip or a circuit) used for a terminal network device.

In this embodiment of this application, the reference signal is a reference signal including location information of the first device, and is collectively denoted as "reference signal" in this embodiment of this application, but it should not be understood as that the "reference signal" includes merely a sounding reference signal SRS. This is not described again in the following. Optionally, the reference signal includes but is not limited to a positioning reference signal (PRS), a demodulation reference signal (DMRS), a tracking reference signal (TRS), and a channel state information reference signal (CSI-RS).

S320: The second device measures the reference signal to obtain a first angle measurement result, where the first angle measurement result is a measurement result of a first measurement object, the first measurement object is a direct path or a reflection path, the first angle measurement result includes M angle measurement parameters, at least one of the M angle measurement parameters in the first angle measurement result includes a plurality of angle measurement values, and M is a positive integer greater than or equal to 1.

Optionally, the second device measures the reference signal to obtain a second angle measurement result, where the second angle measurement result is a measurement result of a second measurement object, and the second measurement object is different from the first measurement object. For example, the first measurement object is a direct path and the second measurement object is a reflection path. For another example, the first measurement object is a reflection path and the second measurement object is a direct path. For another example, the first measurement object is a reflection path and the second measurement object is another reflection path different from the first measurement object.

Optionally, there may be one direct path and a plurality of reflection paths. For example, for the first device, a first direct path, a first reflection path, a second reflection path, and a third reflection path are included. The first measurement object and the second measurement object may be any two measurement objects in the first direct path, the first reflection path, the second reflection path, and the third reflection path. According to the method in this embodiment of this application, the second device may measure a plurality of random measurement objects of the first device.

Optionally, the reference signal received by the second device may be sent by the first device on a direct path, or may be sent by the first device on a reflection path.

Figure 13:
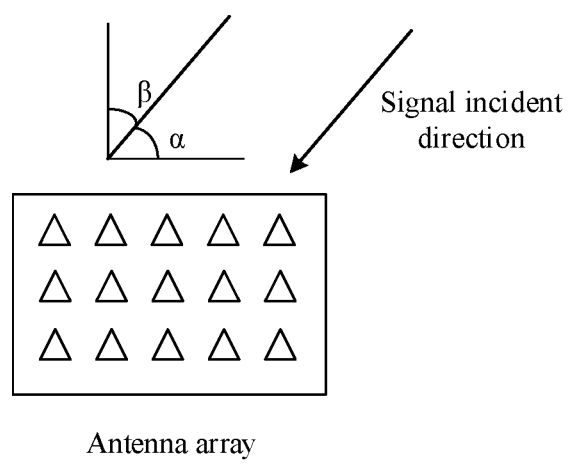
FIG. 13 is a schematic diagram of an antenna lateral array incident angle and an antenna longitudinal array incident angle.

For one measurement object, an angle measurement result may include any M of the following angle measurement parameters (where M is a positive integer greater than or equal to 1): a horizontal incident angle, a vertical incident angle, an antenna lateral array incident angle, and an antenna longitudinal array incident angle. The horizontal incident angle is an angle between a projection of an incident direction on a horizontal plane and the north direction. The vertical incident angle is an angle between the incident direction and the horizontal plane or an angle between the incident direction and a zenith direction. The antenna lateral array incident angle is an angle between the incident direction and an antenna array (row). The antenna longitudinal array incident angle is an angle between the incident direction and an antenna array (column). FIG. 13 is a schematic diagram of an antenna lateral array incident angle and an antenna longitudinal array incident angle. If an antenna array is viewed as a rectangle, a horizontal direction (row) of the antenna array is a length of the rectangle, and a vertical direction (column) of the antenna array is a width of the rectangle, when a reference signal arrives at the antenna array, an angle α between an incident direction and the length of the rectangle is the antenna lateral array incident angle, and an angle β between the incident direction and the width of the rectangle is the antenna longitudinal array incident angle.

For each of M angle measurement parameters, when an antenna array element spacing is equal to ideal value $\lambda/2$, each angle measurement parameter has one angle measurement value; and when the antenna array element spacing is greater than $\lambda/2$, each angle measurement parameter has a plurality of angle measurement values, for example, may be two, three, or more.

It should be understood that when each angle measurement parameter has one angle measurement value, the angle measurement value is a target angle measurement value that needs to be used by a location management unit to calculate a location of a terminal device; and when each angle measurement parameter has a plurality of angle measurement values, only one angle measurement value is a target angle measurement value that needs to be used by the location management unit to calculate the location of the terminal device.

S330: The second device sends an angle measurement result to a location management device, where the angle measurement result may be the first angle measurement result and/or the second angle measurement result; and correspondingly, the location management device receives the angle measurement result from the second device.

The second device may send the angle measurement values of the M angle measurement parameters in the following manners:

Manner 1: A gNB sends M groups of angle measurement values to an LMF each time, where angle measurement parameters corresponding to the M groups of angle measurement values are any M of a horizontal incident angle, a vertical incident angle, an antenna lateral array incident angle, and an antenna longitudinal array incident angle. For example, when M is 4 and each group of angle measurement values include two angle measurement values, the angle measurement result may be reported in the following manner:

horizontal incident angle [measurement value 1, measurement value 2]

vertical incident angle [measurement value 1, measurement value 2]

antenna lateral array incident angle [measurement value 1, measurement value 2]

antenna longitudinal array incident angle [measurement value 1, measurement value 2]

It should be understood that each group of angle measurement values may include a plurality of angle measurement values, one angle measurement value, or zero angle measurement value.

Manner 2: A gNB sends M groups of angle measurement values to an LMF each time, where angle measurement parameters corresponding to the M groups of angle measurement values are any M of a horizontal incident angle, a vertical incident angle, an antenna lateral array incident angle, and an antenna longitudinal array incident angle. It is set that the gNB arranges the M groups of angle measurement values in sequence. As an example rather than limitation, a default arrangement sequence may be shown in Table 1:

TABLE 1

Angle measurement value reporting sequence

| Horizontal incident angle | | Vertical incident angle | | Antenna lateral array incident angle | | Antenna longitudinal array incident angle | |
|---|---|---|---|---|---|---|---|
| Measurement value 1 | Measurement value 2 | Measurement value 3 | Measurement value 4 | Measurement value 5 | 0 | 0 | 0 |

It is set by default that the M groups of angle measurement values are an angle measurement value of the horizontal incident angle, an angle measurement value of the vertical incident angle, an angle measurement value of the antenna lateral array incident angle, and an angle measurement value of the antenna longitudinal array incident angle. Each group of angle measurement values includes two angle measurement values. If there is no corresponding angle measurement value, 0 is filled in. As shown in Table 1, in the angle measurement values reported this time, the first and the second are angle measurement values of the horizontal incident angle, the third and the fourth are angle measurement values of the vertical incident angle, and the fifth and the sixth are angle measurement values of the antenna lateral array incident angle, but the antenna array element spacing is exactly equal to the ideal value $\lambda/2$. Therefore, there is only an angle measurement value 5, and the antenna longitudinal array incident angle has no corresponding angle measurement value.

Manner 3: A gNB sends one group of angle measurement values to an LMF each time, where an angle measurement parameter corresponding to this group of angle measurement values is any one of a horizontal incident angle, a vertical incident angle, an antenna lateral array incident angle, and an antenna longitudinal array incident angle. Optionally, before S330, the method further includes the following step:

S331: The gNB sends configuration information to the LMF; and correspondingly, the LMF receives the configuration information from the gNB, where the configuration information is used to indicate an angle measurement parameter to which an angle measurement value to be sent by the gNB to the LMF next time belongs, for example, any one of the horizontal incident angle, the vertical incident angle, the antenna lateral array incident angle, and the antenna longitudinal array incident angle. The LMF may determine, based on the configuration information sent by the gNB, the angle measurement parameter to which the angle measurement value to be received belongs. For example, if the configuration information indicates the horizontal incident angle, after the LMF receives a plurality of angle measurement values, the LMF may determine that the plurality of angle measurement values all are angle measurement results of the horizontal incident angle.

S340: The location management device determines the location of the first device based on the angle measurement result.

Optionally, after receiving the angle measurement result from the second device, the location management device may perform positioning by using a particle swarm optimization (PSO) algorithm. Specifically, an initialization particle swarm is established, including a random location. Fitness of each particle is evaluated based on a fitness function. A current fitness value of each particle is compared with a fitness value corresponding to an individual historical best location of the particle. If the current fitness value is higher, the historical best location is updated into the current location. A current fitness value of each particle is compared with a fitness value corresponding to a global best location. If the current fitness value is higher, the global best location is updated into the current location. In this way, a location of each particle is updated. The algorithm stops when the algorithm reaches a maximum quantity of iterations or an increment of the best fitness value is less than a given threshold. In this case, the corresponding location of the first device is the location of the first device calculated by the PSO algorithm. Optionally, in multi-station joint angle positioning, an angle measurement result corresponding to a direct path may be substituted into the PSO algorithm to determine the location of the first device. Optionally, a plurality of angle measurement parameters of each angle measurement object, for example, a horizontal incident angle and a vertical incident angle, may all be substituted into the PSO algorithm, thereby implementing three-dimensional positioning on the first device.

Optionally, after receiving the angle measurement result from the second device, the location management device may perform positioning by using a weighting method. Specifically, in the angle measurement result, each angle measurement parameter includes a plurality of angle measurement values, for example, includes two angle measurement values. In this case, a weight of the first angle measurement value $\alpha$ is a, and a weight of the second angle measurement value $\beta$ is b, where a+b=1, and a calculated target angle value $\gamma$ is the signal incident angle. In this case, $\gamma=a\alpha+b\beta$. Alternatively, each angle measurement parameter includes three angle measurement values. In this case, a weight of the first angle measurement value $\alpha$ is a, a weight of the second angle measurement value $\beta$ is b, and a weight of the third angle measurement value $\delta$ is c, where a+b+c=1, and a target angle value $\gamma$ is the signal incident angle. In this case, $\gamma=a\alpha+b\beta+c\delta$.

FIG. 1 to FIG. 8 describe the angle measurement result sending method according to the embodiments of this application in detail. The following describes an apparatus for sending an angle measurement result in the embodiments of this application with reference to FIG. 9 to FIG. 12. It should be understood that the technical features described in the method embodiments are also applicable to the following apparatus embodiments.

Figure 9:
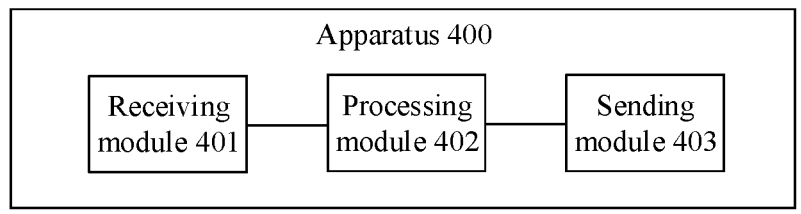
FIG. 9 is a schematic block diagram of a communication apparatus according to an embodiment of this application.

FIG. 9 is a schematic block diagram of a communication apparatus 400 according to an embodiment of this application. The apparatus 400 is configured to perform the method performed by the second device in the foregoing method embodiments. Optionally, a specific form of the apparatus 400 may be the second device or a chip in the second device. The apparatus 400 includes: a receiving module 401, a processing module 402, and a sending module 403.

The receiving module 401 is configured to receive a reference signal sent by a first device.

The processing module 402 is configured to measure the reference signal received by the receiving module to obtain a first angle measurement result, where the first angle measurement result is a measurement result of a first measurement object, the first measurement object is a direct path or a reflection path, the first angle measurement result includes M angle measurement parameters, at least one of the M angle measurement parameters in the first angle measurement result includes a plurality of angle measurement values, and M is a positive integer greater than or equal to 1.

The sending module 403 is configured to send, to a location management device, the first angle measurement result determined by the processing module 402.

Optionally, the M angle measurement parameters are any M of the following angle measurement parameters: a horizontal incident angle, a vertical incident angle, an antenna lateral array incident angle, and an antenna longitudinal array incident angle.

Optionally, the processing module 402 is further configured to measure the reference signal to obtain a second angle measurement result, where the second angle measurement result is a measurement result of a second measurement object, the second measurement object is a direct path or a reflection path, the second angle measurement result includes M angle measurement parameters, and at least one of the M angle measurement parameters in the second angle measurement result includes a plurality of angle measurement values.

The sending module 403 is further configured to send the second measurement result to the location management device.

For specific functions and beneficial effects of the receiving module 401, the processing module 402, and the sending module 403, refer to the foregoing embodiments. For brevity, details are not described herein again.

Figure 10:
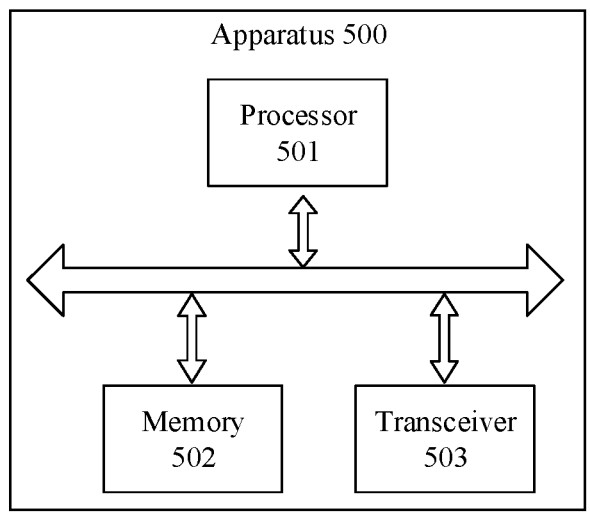
FIG. 10 is a schematic diagram of a structure of a communication apparatus according to an embodiment of this application.

FIG. 10 is a block diagram of a structure of a communication apparatus according to an embodiment of this application. The communication apparatus 500 shown in FIG. 10 includes: a processor 501, a memory 502, and a transceiver 503.

The processor 501, the memory 502, and the transceiver 503 communicate with each other through an internal connection path, to transfer a control signal and/or a data signal.

The method disclosed in the foregoing embodiment of this application may be applied to the processor 501, or may be implemented by the processor 501. The processor 501 may be an integrated circuit chip and has a signal processing capability. In an implementation process, the steps in the foregoing methods can be implemented by using a hardware integrated logic circuit in the processor 501, or by using instructions in a form of software. The foregoing processor 501 may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 502. The processor 501 reads instructions in the memory 502 and completes the steps in the foregoing method in combination with the hardware in the processor 501.

Optionally, in some embodiments, the memory 502 may store instructions used to perform the method performed by the second device in the method shown in FIG. 8. The processor 501 may execute the instructions stored in the memory 502 and complete the steps of the second device in the method shown in FIG. 8 in combination with other hardware (for example, the transceiver 503). For a specific working process and beneficial effects, refer to the descriptions in the embodiment shown in FIG. 8.

Figure 11:
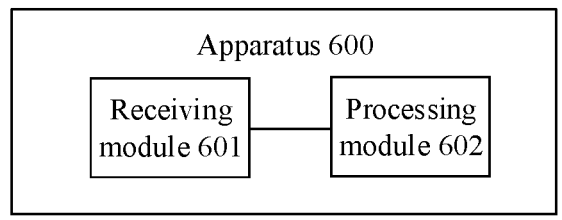
FIG. 11 is a schematic block diagram of a communication apparatus according to another embodiment of this application.

FIG. 11 is a schematic block diagram of a communication apparatus 600 according to another embodiment of this application. The apparatus 600 is configured to perform the method performed by the location management device in the foregoing method embodiments. Optionally, a specific form of the apparatus 600 may be the location management device or a chip in the location management device. This is not limited in this embodiment of this application. The apparatus 600 includes a receiving module 601 and a processing module 602.

The receiving module 601 is configured to receive a first angle measurement result sent by a second device, where the first angle measurement result is a measurement result of a first measurement object, the first measurement object is a direct path or a reflection path, the first angle measurement result includes M angle measurement parameters, at least one of the M angle measurement parameters in the first angle measurement result includes a plurality of angle measurement values, and M is a positive integer greater than or equal to 1.

The processing module 602 is configured to determine a location of a first device based on the first angle measurement result received by the receiving module.

Optionally, the M angle measurement parameters are any M of the following angle measurement parameters: a horizontal incident angle, a vertical incident angle, an antenna lateral array incident angle, and an antenna longitudinal array incident angle.

Optionally, the receiving module 601 is further configured to receive a second angle measurement result sent by the second device, where the second angle measurement result is a measurement result of a second measurement object, the second measurement object is a direct path or a reflection path, the second angle measurement result includes M angle measurement parameters, and at least one of the M angle measurement parameters in the second angle measurement result includes a plurality of angle measurement values.

The processing module 602 is further configured to determine a location of a first device based on the second angle measurement result.

For specific functions and beneficial effects of the receiving module 601 and the processing module 602, refer to the foregoing embodiments. For brevity, details are not described herein again.

Figure 12:
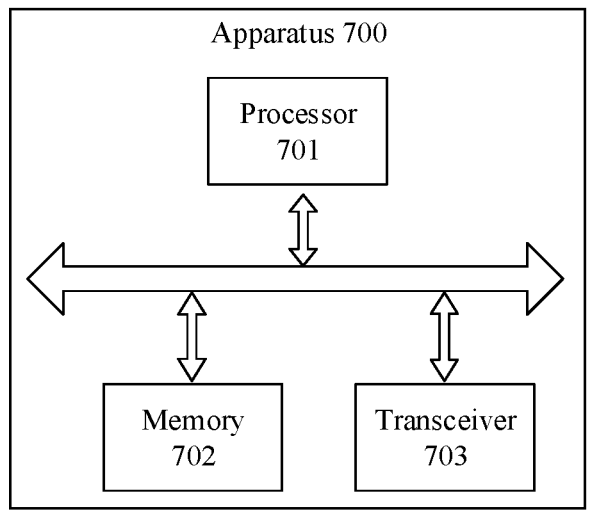
FIG. 12 is a schematic diagram of a structure of a communication apparatus according to another embodiment of this application.

FIG. 12 is a diagram of a structure of a communication apparatus according to another embodiment of this application. The communication apparatus 700 shown in FIG. 12 includes: a processor 701, a memory 702, and a transceiver 703.

The processor 701, the memory 702, and the transceiver 703 communicate with each other through an internal connection path, to transfer a control signal and/or a data signal.

Optionally, in some embodiments, the memory 702 may store instructions used to perform the method performed by the second device in the method shown in FIG. 8. The processor 701 may execute the instructions stored in the memory 702 and complete the steps of the second device in the method shown in FIG. 8 in combination with other hardware (for example, the transceiver 703). For a specific working process and beneficial effects, refer to the descriptions in the embodiment shown in FIG. 8.

It may be understood that the memory in the embodiments of this application may be a volatile memory or a non-volatile memory, or may include both a volatile memory and a non-volatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external buffer. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories of the systems and methods described in this specification are intended to include but are not limited to these memories and a memory of any other proper type.

An embodiment of this application further provides a chip, and the chip includes a transceiver unit and a processing unit. The transceiver unit may be an input/output circuit or a communication interface. The processing unit is a processor, a microprocessor, or an integrated circuit, integrated on the chip. The chip may perform the method performed by the second device or the location management device in the foregoing method embodiments.

An embodiment of this application further provides a chip, and the chip includes a transceiver unit and a processing unit. The transceiver unit may be an input/output circuit or a communication interface. The processing unit is a processor, a microprocessor, or an integrated circuit, integrated on the chip. The chip may perform the method performed by the location management device in the foregoing method embodiments.

An embodiment of this application further provides a computer-readable storage medium. The computer-readable storage medium stores instructions. When the instructions are executed, the method performed by the second device or the location management device in the foregoing method embodiments is performed.

An embodiment of this application further provides a computer-readable storage medium. The computer-readable storage medium stores instructions. When the instructions are executed, the method performed by the location management device in the foregoing method embodiments is performed.

An embodiment of this application further provides a computer program product including instructions. When the instructions are executed, the method performed by the second device in the foregoing method embodiments is performed.

An embodiment of this application further provides a computer program product including instructions. When the instructions are executed, the method performed by the location management device in the foregoing method embodiments is performed.

It should be understood that in the embodiments of this application, the numbers "first" and "second" are merely used to distinguish between different objects, for example, to distinguish between different devices, and do not constitute a limitation on the scope of the embodiments of this application. The embodiments of this application are not limited thereto.

It should also be understood that the term "and/or" in this specification describes only an association relationship for describing associated objects and indicates that three relationships may exist. For example, A and/or B may indicate the following three cases: Only A exists, both A and B exist, and only B exists. In addition, the character "/" in this specification usually indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described systems, apparatuses, and units, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An angle measurement result sending method, comprising:
   receiving a reference signal sent by a first device;
   measuring the reference signal to obtain a first angle measurement result, wherein the first angle measurement result is a measurement result of a first measurement object, the first measurement object is a first path of the reference signal, the first angle measurement result comprises M angle measurement parameters, at least one of the M angle measurement parameters in the first angle measurement result comprises a plurality of angle measurement values, and M is a positive integer greater than or equal to 1; and
   sending the first angle measurement result to a location management device.

2. The method according to claim 1, wherein the M angle measurement parameters are any M of the following angle measurement parameters: a horizontal incident angle, a vertical incident angle, an antenna lateral array incident angle, and an antenna longitudinal array incident angle.

3. The method according to claim 1, wherein the method further comprises:
   measuring the reference signal to obtain a second angle measurement result, wherein the second angle measurement result is a measurement result of a second measurement object, the second measurement object is a second path of the reference signal, the second angle measurement result comprises M second angle measurement parameters, and at least one of the M second angle measurement parameters in the second angle measurement result comprises a plurality of second angle measurement values; and
   sending the second measurement result to the location management device.

4. An angle measurement result sending method, comprising:
   receiving a first angle measurement result sent by a second device, wherein the first angle measurement result is a measurement result of a first measurement object, the first measurement object is a first path of the reference signal, the first angle measurement result comprises M angle measurement parameters, at least one of the M angle measurement parameters in the first angle measurement result comprises a plurality of angle measurement values, and M is a positive integer greater than or equal to 1; and
   determining a location of a first device based on the first angle measurement result.

5. The method according to claim 4, wherein the M angle measurement parameters are any M of the following angle measurement parameters: a horizontal incident angle, a vertical incident angle, an antenna lateral array incident angle, and an antenna longitudinal array incident angle.

6. The method according to claim 4, wherein the method further comprises:
   receiving a second angle measurement result sent by the second device, wherein the second angle measurement result is a measurement result of a second measurement object, the second measurement object is a second path of the reference signal, the second angle measurement result comprises M second angle measurement parameters, and at least one of the M second angle measurement parameters in the second angle measurement result comprises a plurality of second angle measurement values; and
   determining the location of the first device based on the second angle measurement result.

7. A communication apparatus, comprising:
   a receiver, configured to receive a reference signal sent by a first device;
   a processor, configured to measure the reference signal received by the receiver to obtain a first angle measurement result, wherein the first angle measurement result is a measurement result of a first measurement object, the first measurement object is a first path of the reference signal, the first angle measurement result comprises M angle measurement parameters, at least one of the M angle measurement parameters in the first angle measurement result comprises a plurality of angle measurement values, and M is a positive integer greater than or equal to 1; and
   a sender, configured to send, to a location management device, the first angle measurement result determined by the processor.

8. The apparatus according to claim 7, wherein the M angle measurement parameters are any M of the following angle measurement parameters: a horizontal incident angle, a vertical incident angle, an antenna lateral array incident angle, and an antenna longitudinal array incident angle.

9. The apparatus according to claim 7, the processor is further configured to measure the reference signal to obtain a second angle measurement result, wherein the second angle measurement result is a measurement result of a second measurement object, the second measurement object is a second path of the reference signal, the second angle measurement result comprises M second angle measurement parameters, and at least one of the M second angle measurement parameters in the second angle measurement result comprises a plurality of second angle measurement values; and the sender is further configured to send, to the location management device, the second measurement result determined by the processor.

10. A communication apparatus, comprising:
- a receiver, configured to receive a first angle measurement result sent by a second device, wherein the first angle measurement result is a measurement result of a first measurement object, the first measurement object is a first path of the reference signal, the first angle measurement result comprises M angle measurement parameters, at least one of the M angle measurement parameters in the first angle measurement result comprises a plurality of angle measurement values, and M is a positive integer greater than or equal to 1; and
- a processor, configured to determine a location of a first device based on the first angle measurement result received by the receiver.

11. The apparatus according to claim 10, wherein the M angle measurement parameters are any M of the following angle measurement parameters: a horizontal incident angle, a vertical incident angle, an antenna lateral array incident angle, and an antenna longitudinal array incident angle.

12. The apparatus according to claim 10, wherein the receiver is further configured to receive a second angle measurement result sent by the second device, the second angle measurement result is a measurement result of a second measurement object, the second measurement object is a second path of the reference signal, the second angle measurement result comprises M second angle measurement parameters, and at least one of the M second angle measurement parameters in the second angle measurement result comprises a plurality of second angle measurement values; and the processor is further configured to determine the location of the first device based on the second angle measurement result received by the receiver.

\* \* \* \* \*